US011157928B2

(12) United States Patent
Dagley et al.

(10) Patent No.: US 11,157,928 B2
(45) Date of Patent: Oct. 26, 2021

(54) SYSTEMS AND METHODS FOR USING A PREDICTIVE ENGINE TO PREDICT FAILURES IN MACHINE-LEARNING TRAINED SYSTEMS

(71) Applicant: Capital One Services, LLC, McLean, VA (US)

(72) Inventors: Geoffrey Dagley, McKinney, TX (US); Stephen Anderson, Plano, TX (US); Stephen Wylie, Carrollton, TX (US); Qiaochu Tang, The Colony, TX (US); Micah Price, Plano, TX (US); Jason Hoover, Grapevine, TX (US); Kristen Przano, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/659,873

(22) Filed: Oct. 22, 2019

(65) Prior Publication Data
US 2021/0117994 A1  Apr. 22, 2021

(51) Int. Cl.
*G06Q 30/02* (2012.01)
*G06K 9/62* (2006.01)
*G06N 20/00* (2019.01)

(52) U.S. Cl.
CPC ....... *G06Q 30/0202* (2013.01); *G06K 9/6218* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,693,782 | B1 | 4/2010 | Stricker et al. |
| 2004/0172371 | A1* | 9/2004 | Mitsuoka ............... G06Q 10/06 705/80 |

(Continued)

OTHER PUBLICATIONS

Ho Geun Lee, "Electronic market intermediary: transforming technical feasibility into institutional reality," Proceedings of the Thirtieth Hawaii International Conference on System Sciences, 1997, pp. 3-12 vol. 4, doi: 10.1109/HICSS.1997.663357. (Year: 1997).*

(Continued)

*Primary Examiner* — Stephanie Z Delich
(74) *Attorney, Agent, or Firm* — Bookoff McAndrews, PLLC (57) ABSTRACT

A computer-implemented method for using a machine-learning trained predictive engine to predict failures includes receiving electronic prior transaction data corresponding to a plurality of prior successful transactions and a plurality of prior unsuccessful transactions, and training a machine learning predictive engine based on the plurality of prior successful transactions and the plurality of prior unsuccessful transactions. Electronic transaction data may be received, the electronic transaction data being associated with a user, an item, and candidate transaction terms, the electronic transaction data being associated with a candidate transaction. The machine learning predictive engine may determine a likelihood of success of the candidate transaction based on the electronic transaction data, and display the likelihood of success of the candidate transaction.

20 Claims, 5 Drawing Sheets

(56) References Cited

U.S. PATENT DOCUMENTS

| | | | | |
|---|---|---|---|---|
| 2009/0282415 A1* | 11/2009 | An | ................. | G06F 9/5038 |
| | | | | 718/104 |
| 2009/0288012 A1* | 11/2009 | Hertel | ................ | G06Q 20/10 |
| | | | | 715/738 |
| 2013/0138563 A1* | 5/2013 | Gilder | ............... | G06Q 20/4016 |
| | | | | 705/44 |
| 2013/0191290 A1* | 7/2013 | Glendenning | ......... | G06Q 20/40 |
| | | | | 705/71 |
| 2014/0222716 A1* | 8/2014 | Joplin | .................. | G06Q 40/06 |
| | | | | 705/36 R |
| 2014/0358781 A1* | 12/2014 | Zeigler | ................. | G06Q 20/40 |
| | | | | 705/44 |
| 2015/0199754 A1* | 7/2015 | Greystoke | .......... | G06Q 30/0619 |
| | | | | 705/307 |
| 2015/0348186 A1 | 12/2015 | Samteladze et al. | | |
| 2016/0034889 A1* | 2/2016 | Downs | ................ | G06Q 20/382 |
| | | | | 705/26.41 |
| 2018/0082372 A1* | 3/2018 | Diana | ................. | G06Q 40/025 |
| 2018/0285860 A1* | 10/2018 | Prabhu | ................ | G06Q 20/325 |
| 2019/0026672 A1* | 1/2019 | Notani | ................. | H04L 9/3239 |
| 2019/0213660 A1* | 7/2019 | Astrada | .................. | G06F 16/00 |
| 2019/0347569 A1* | 11/2019 | Breed | ................... | G06N 20/00 |
| 2019/0362414 A1* | 11/2019 | Viegas | ................ | G06Q 20/227 |

OTHER PUBLICATIONS

J. Yen, J. Hu and T. X. Bui, "Intelligent clearinghouse: electronic marketplace with computer-mediated negotiation supports," Proceedings of the 33rd Annual Hawaii International Conference on System Sciences, 2000, pp. 10 pp. vol. 2-, doi: 10.1109/HICSS. 2000.926633. (Year: 2000).*

* cited by examiner

SYSTEMS AND METHODS FOR USING A PREDICTIVE ENGINE TO PREDICT FAILURES IN MACHINE-LEARNING TRAINED SYSTEMS

TECHNICAL FIELD

Various embodiments of the present disclosure relate generally to using a predictive engine to predict failures using machine learning trained systems, and relate particularly to methods and systems for predicting the likelihood of success of candidate transactions.

BACKGROUND

Transactions may require analysis of candidate (e.g., proposed, potential) terms prior to execution. Any of the candidate terms may increase or decrease the likelihood that the transaction will ultimately occur. There is a need for automated analysis of candidate terms in order to increase the predictability of, and accelerate term determination for, transactions.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for predicting a likelihood of success of transactions. Each of the examples disclosed herein may include one or more of the features described in connection with any of the other disclosed examples.

In one example, a computer-implemented method for using a machine-learning trained predictive engine to predict failures, includes receiving electronic prior transaction data corresponding to a plurality of prior successful transactions and a plurality of prior unsuccessful transactions, and training a machine learning predictive engine based on the electronic prior transaction data corresponding to the plurality of prior successful transactions and the plurality of prior unsuccessful transactions. Additionally, the method may include receiving electronic transaction data comprising a user, an item, and candidate transaction terms, the electronic transaction data being associated with a candidate transaction. Further, the method may include determining, by the machine learning predictive engine, a likelihood of success of the candidate transaction based on the electronic transaction data, and displaying the likelihood of success of the candidate transaction.

In one example, a computer-implemented method for using a machine-learning trained predictive engine to predict failures may include receiving electronic prior transaction data corresponding to a plurality of prior successful transactions and a plurality of prior unsuccessful transactions, and training a machine learning predictive engine based on the electronic prior transaction data corresponding to the plurality of prior successful transactions and the plurality of prior unsuccessful transactions. Additionally, the method may include receiving electronic transaction data comprising a user, an item, and candidate transaction terms, the electronic transaction data being associated with a candidate transaction. Further, the method may include determining, by the machine learning predictive engine, a likelihood of success of the candidate transaction based on the electronic transaction data, and determining whether the likelihood of success is below a predetermined threshold. In response to determining that the likelihood of success is below a predetermined threshold, the method may include determining one or more alternate terms of the candidate transaction that increase the likelihood of success above the predetermined threshold, and display the alternate terms of the candidate transaction.

In another example, a system for using a machine-learning trained predictive engine to predict failures, and one or more processors configured to execute the instructions to perform operations including receiving electronic prior transaction data corresponding to a plurality of prior successful transactions and a plurality of prior unsuccessful transactions, and training a machine learning predictive engine based on the electronic prior transaction data corresponding to the plurality of prior successful transactions and the plurality of prior unsuccessful transactions. Electronic transaction data may be received, the electronic transaction data comprising a user, an item, and candidate transaction terms, the electronic transaction data being associated with a candidate transaction. The machine learning predictive engine may determine a likelihood of success of the candidate transaction based on the electronic transaction data, and display the likelihood of success of the candidate transaction.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for using a predictive engine to forecast the outcome of candidate transactions. As will be discussed below in more detail, in methods and systems according to the present disclosure, existing techniques may be improved.

Negotiated transactions, such as for the purchase of an item, may involve one or more brokers, and one or more lenders, in addition to client (buyer/customer) and seller. These negotiated transactions may have a plurality of terms beyond merely the price of the item, such as annual percentage rate (APR), payback time period, months of payback, etc.

Since three or more parties may need to all agree on terms of the transaction, this may lead to rounds of negotiations where two of the parties agree, but an additional party declines, thus initiating another round of negotiation. This process may become protracted. For example, with the sale of an automobile, the dealer and the buyer may agree on terms, but the lender may decline due to unacceptably low APR, unacceptably long payback time period, unacceptably low down payment, etc. The lender may simply respond with a "yes" or "no," thus leaving the buyer and dealer unsure as to how to best renegotiate the terms in order to complete the transaction. Lenders may be flexible, for example, when/if the dealer and/or customer is valued (e.g., if they are high-volume), but often any deviation from an acceptable range simply results in a "no" response without explanation from the lender. This may also happen in an online environment where the client/customer may enter proposed terms e.g., via a web portal. The client may expend time and energy renegotiating terms, rebates, back-end add-ons, front-end values, trade-in values, down payment amounts, APR, and/or payback months that may be unacceptable to the dealer and/or the lender. Time may be wasted while the dealer and/or client requests approval of unfeasible terms (from the lender's or dealer's perspective) for multiple rounds of negotiation. These same problems may exist for the sale of homes, or the sale of any item where terms must be agreed upon by more than two parties.

Accordingly, a need exists to more quickly and reliably arrive at terms acceptable to all parties to a transaction.

As used herein, the term "dealer" may indicate, and may be used interchangeably with, a seller of items or services, a broker of items or services, etc. The term "client" may indicate, and may be used interchangeably with, a customer, buyer, person attempting to obtain a lease, ownership, ownership share, etc., of an item and/or service.

Figure 1:
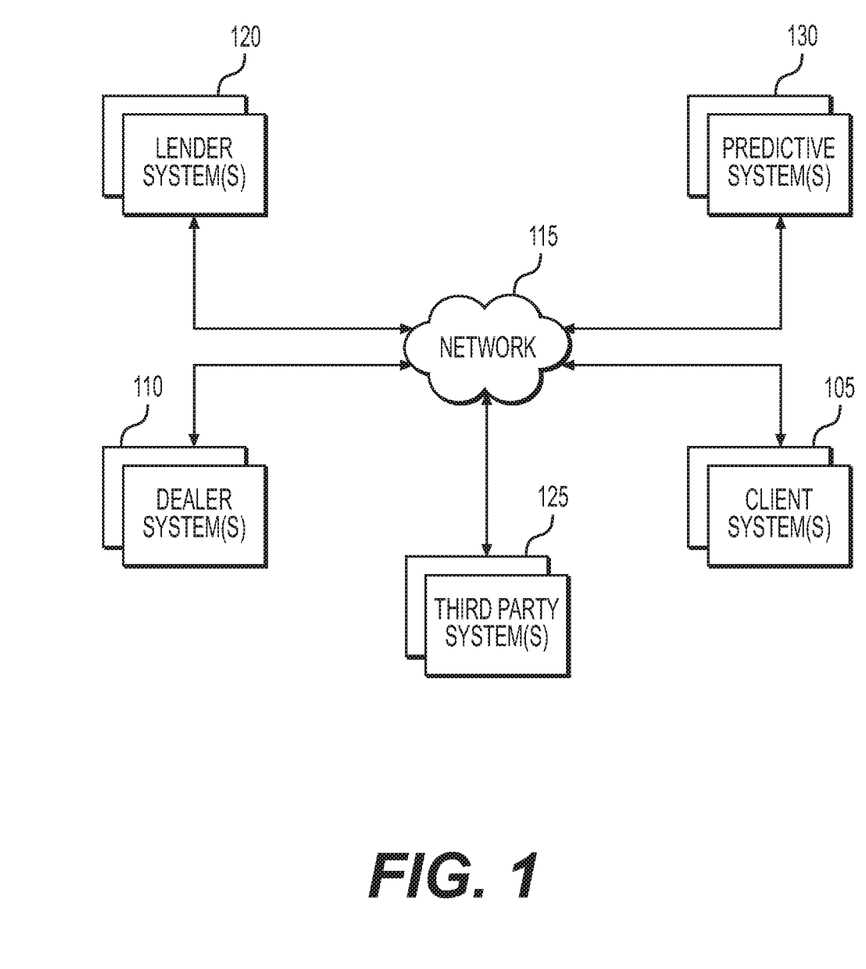
FIG. 1 depicts a client-server environment, according to one or more embodiments.

FIG. 1 depicts a client-server environment that may be utilized with techniques presented herein. One or more client system(s) 105 and/or dealer system(s) 110 may communicate across an electronic network 115 with one or more lender system(s) 120. The systems of FIG. 1 may communicate in any arrangement. For example, client system 105 may communicate with a dealer system 110 regarding candidate terms for a transaction. Dealer system 110 may then communicate with lender system 120, if necessary, to propose candidate terms for financing that the client may require. Alternatively, the client may be on site at the dealer location, and the dealer system 110 alone may communicate with the lender system 120 to propose terms of a transaction. Alternatively, the client system 105 and dealer system 110 may communicate with each other, without involving the lender system 120. The dealer system 110 and/or lender system 120 may utilize one or more third party system(s) 125 in order to acquire additional information about the client, the dealer, the lender, etc., that may be useful in deciding whether to agree to proposed terms, and/or which terms to propose, etc. For example, the lender may pull the credit score of a client after receiving proposed terms for the financing of a car from the dealer system 110 and/or client system 105.

As will be discussed herein, one or more predictive systems 130 may communicate with lender system 120, dealer system 110, and/or client system 105 to assist the lender, dealer, and/or client in deciding whether to agree to proposed terms of a transaction. The predictive system 130 may suggest new, alternate, and/or additional terms to increase the likelihood that a transaction will be acceptable, as will be discussed further herein.

While FIG. 1 depicts the various systems as physically separate and communicating across network 115, in various embodiments features of certain systems, such as the predictive system 130, may be incorporated partially or completely into any of the other systems of FIG. 1. For example, predictive system 130 may be incorporated into lender system 120. Some or all of the functionality of the predictive system 130 may be incorporated into client system 105, for example, some or all of the functionality of the predictive system 130 may be incorporated into an internet browser extension or website page usable by a user.

Figure 2:
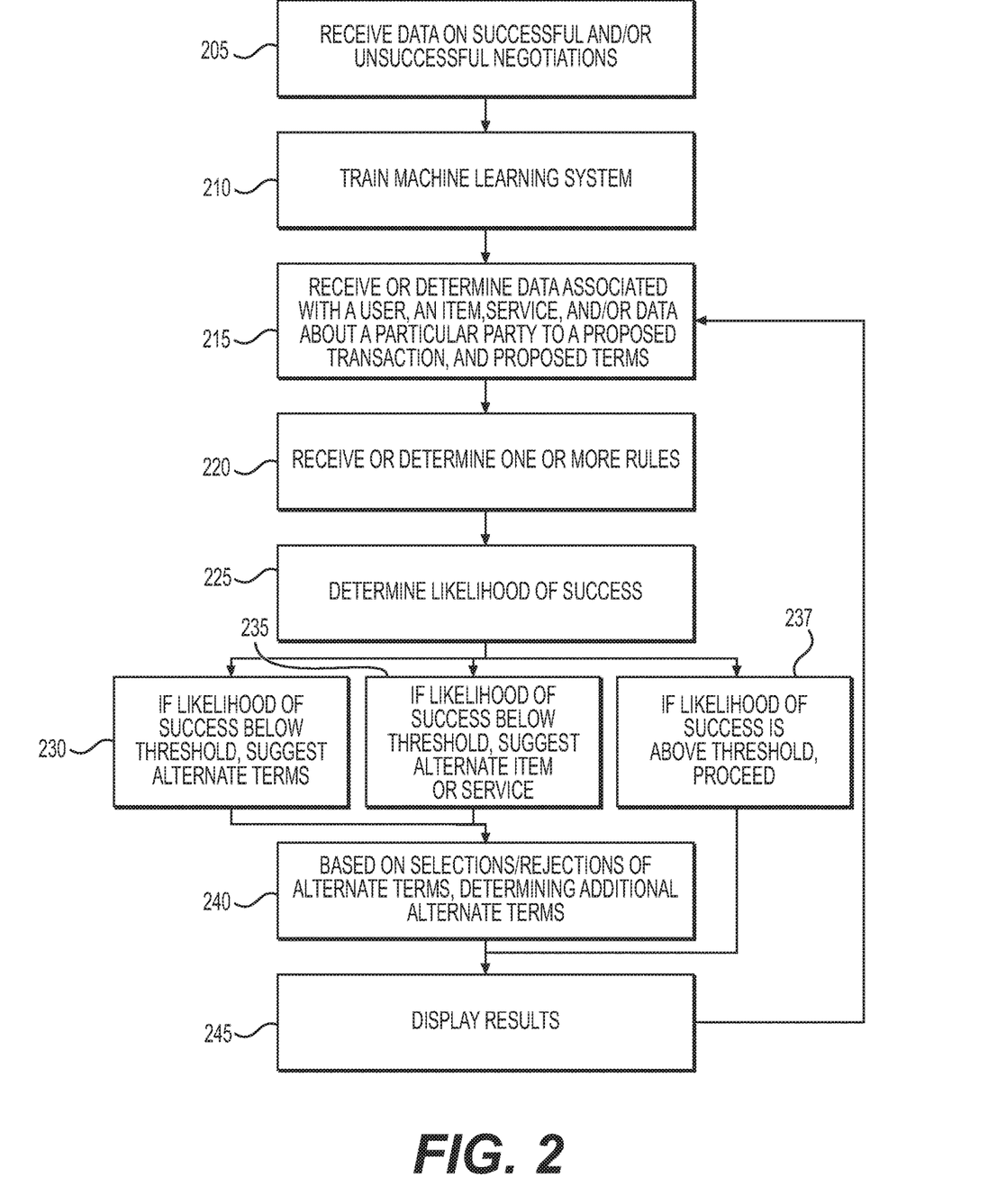
FIG. 2 illustrates a process for using a predictive engine to forecast the outcome of candidate transactions, according to one or more embodiments.

FIG. 2 illustrates a process for using a predictive engine to forecast the outcome of candidate transactions, according to one or more embodiments. At step 205, the predictive system 130 may receive data on successful and/or unsuccessful negotiations. Lenders and/or dealers often have voluminous data about the terms and/or proposed terms of transactions that may be used to train a predictive engine, e.g., predictive system 130. The data may comprise records of past proposed terms for the sale of items, proposed terms of financing, seller-specific information about sales volume, items/models sold, dealer location, seasonal variations in sales for particular items or models, trends in sales for particular items, salesperson-specific data, front-end terms of prior negotiations (front-end referring to basic sale price or amount to be financed related to the core item for sale), back-end terms of prior negotiations (add-on items or services beyond the core item for sale), down payments, trade-ins, payback time periods, proposed APRs, item type/make/model/year/condition, dealer profits on prior completed transactions, and/or lender profits on prior completed transactions, etc. The data may further comprise client/customer data such as credit scores, income, credit history, overall financial health, client demographics, client search history of online activity, home ownership status, occupation, marital/family status, etc.

Data may be obtained on proposed terms that were not accepted by one or more of the parties—i.e., deals that did not succeed. For example, data may be obtained on proposed terms from the dealer that were received by lenders for which the lender approved, but the client did not.

At step 210, the data obtained in step 205 may be used to train a machine learning system that may act as a predictive engine used by predictive system 130. The data may be dealer-specific, in order to maximize the accuracy of the predictive engine. Certain dealers may be more proficient at selling certain items, certain services, certain models, at certain times of year, times of week, etc., and this may be factored into the predictive engine. The data may also (or alternatively) be salesperson-specific. Differing salespeople may have differing negotiation strengths and weaknesses, and may sell certain items more reliably than others, any or all of which may be factored in by the predictive engine when considering a potential transaction.

Alternatively, if, for example, it is determined that there is insufficient data to train the predictive engine on a single dealer, data may be obtained from multiple dealerships that are determined to be substantially similar. For example, dealerships with similar sales volumes, inventories, geographic locations, etc., may be used as substitute for, or in combination with, data for the particular dealership utilizing the predictive engine. For example, the predictive engine may, as a rule, require data for a predetermined number of successful negotiations and a second predetermined number of unsuccessful negotiations in order to be considered fully trained. This data may be obtained from the dealership in question, but if the data provided is not available or insufficient, data may be acquired from dealerships meeting predetermined metrics of similarity until sufficient data regarding the predetermined numbers of successful and unsuccessful negotiations is obtained. As will be discussed further herein, once the predictive engine is fully trained, it may be used to predict the likelihood of success of a proposed transaction, and/or suggest alternate terms of the transaction that are likely to be successful.

The definition of "successful" prior transactions and "unsuccessful" prior transactions may vary, and may be changed by the user. For example, loans that were given in an ostensibly successful transaction may nonetheless be considered "unsuccessful" if a return-on-investment (ROI) percentage and/or value threshold is not met. The loan-to-value (LTV) ratio (the ratio of the loan to the value of the asset purchased) may also be considered. If the LTV is not above a predetermined threshold, the transaction may be deemed "unsuccessful."

The trained model may consider any of the data received from step 205. Any of the price of the item or service, the age or condition of the item, etc., may be considered. Additional derivative metrics may be determined based on the data received in step 205. For example, if data is received regarding the client's behavior on client system 105 that includes the various financing terms proposed by the client, a range in financing terms may be determined. If the client is entering a range of candidate financing or other terms beyond a predetermined range, this may indicate a higher willingness to haggle, which the predictive system may report to the dealer and/or lender. A willingness to haggle metric may be determined based on the range of terms proposed by the client, which may be considered by the predictive engine when predicting a likelihood of success of the transaction, when making terms modification suggestions, and/or when performing any of the techniques discussed herein. If the client has above a predetermined threshold for the willingness to haggle metric, the predictive engine may ultimately rate the likelihood of a successful transaction as more likely. Further, the predictive engine may urge negotiations to proceed for longer, and may suggest larger term negotiations than otherwise, if the willingness to haggle metric is above a threshold.

The predictive engine may deploy machine learning techniques, such as linear regression, logistical regression, random forest, gradient boosted machine (GBM), and/or a deep neural network. Supervised or unsupervised training may be employed. For example, unsupervised approaches may include K-means clustering. K-Nearest Neighbors may also be used, which may be supervised or unsupervised. Combinations of K-Nearest Neighbors and an unsupervised cluster technique may also be used. Any of the N variables from the data received in step 205 (or derived therefrom) may correspond to a dimension in the model. As the machine learning system is trained, negotiation terms that have been successful in the past may form clusters in N-dimensional space. When the predictive engine ultimately makes a forecast and/or recommendation, as will be discussed further below, data from the current negotiation may be fed to the machine learning system, for example, as an N-dimensional vector. Whatever clusters in the model are closest to the current terms in N-dimensional space, and the outcomes associated therewith, may determine whether the negotiation is likely to be successful, may help suggest modifications, etc.

Simpler models may be deployed in parallel for speed. For example, rather than analyze all N variables in the current negotiation, a small number of predetermined primary metrics N-X may be fed to a simplified machine learning system to quickly determine if the current negotiation is close to other successful transactions. For example, a customer credit score, annual income, candidate APR, candidate financing amount, and candidate payback period may be fed to a machine learning system trained on these variables. If the dealer and client are having difficulty reaching an agreement, for example, the full machine learning system may be employed to make more detailed recommendations.

The number of variables analyzed by the predictive engine may be limited to a predetermined number. A few direct or derived variables may be determined and used to perform techniques discussed herein. For example, a history of a particular dealer's successful deals over a predetermined period, such as the past month, may be used to create an "average dealer success rate" variable. Other variables may include "average dealership APRs in the last month," (or some other predetermined time period) and/or "average sales price on cars the customer viewed online." These variables may be provided to the predictive engine for processing, according to techniques presented herein.

Other summary statistics may be generated such as averages, or distributions of different variables like back-end, price, APR, down payment, etc. These variables could be stratified in multiple ways. For example, the average back-end for this particular band of customers may be determined, as well as the average back-end at this dealership, and/or the average back-end for all cars of this make/model in a predetermined range of years (e.g., 2007-2011 for a 2009 model car). Then the predictive engine may display a relationship between the deal information (e.g., the back-end) of this particular deal and the expected statistics. For example, the display may be "this back-end is above average (mean/median) for customers like you/cars like this/this dealership." The display may also be, for example, "this back-end is 20% higher than the average (mean or median)," or "this back-end is more expensive than 60% of back-ends (percentiles)."

If there is a search history for a customer, similar preferences to other customers may be used to boost a recommendation for customers like them. Feature vectors may be generated for the current and past customers, and preferences may be recommended based upon a determined similarity to past customers.

At step 215, data may be received corresponding to the current negotiation for a transaction. This may include data associated with the user (e.g., client), data about the item or service, and/or data about a particular party (e.g., a particular dealer and/or salesperson) to the proposed transaction. This data may be received at the predictive system 130, and may be provided by the lender system 120, dealer system 110, third party system 125, and/or client system 105.

At step 220 one or more rules may be determined, for example upon being received from users of the predictive engine, that may reduce the number of possible recommendations provided in later steps. For example, a rule may be set that a down payment be limited to a certain maximum amount, perhaps because the client may only have a certain amount of money. Rules may be set by a user, dealer, lender, etc., or may be set by the predictive engine automatically based on the machine learning analysis. For example, while the nearest successful terms may suggest raising the offer for purchase by $X, the predictive engine may also determine that clients generally are very likely to reject an increase in the dollar amount above a predetermined value. The predictive engine may instead suggest adding back-end items, or make other suggestions for ways to increase the odds of success of the negotiation that do not violate the rules. A lender may establish a rule to never accept terms if the APR is a predetermined value below the market rate, regardless of the other terms of the transaction. Rules may also be set for the transaction in question, or generally across all transactions.

At step 225, the predictive engine may determine, based on the predictive engine and the information provided about the current negotiation, whether the negotiation is likely to be successful. The machine learning system may consider parameters of the item or service being considered. In a car, for example, the make, model, year, mileage, etc., may all be considered. The terms of the loan being requested may be considered (amount, APR, payback months, etc.), and the client financial health may also be considered.

The machine learning system may consider a variety of factors that may not be obvious to a human when determining a likelihood of success. Particular dealerships might have particular talents, for example in selling back-end add-ons, selling sedans to less financially stable customers, and/or selling SUVs to more financially stable customers.

The predictive engine may utilize weights and thresholds, and may utilize any of the rules previously determined/received in step 220. For example, if the down payment is more than a predetermined distance or percentage off of a known successful range, or if the APR is more than a predetermined percentage off a known successful range, the predictive engine may automatically conclude that the negotiation is unlikely to be successful.

The predictive engine may consider whether the candidate terms of the current negotiation are likely to be successful by classifying the candidate terms into bands. Thus, the proposed price may be associated with a similar price band, the item may be associated with a band of similar items, the customer may be associated with a similar band of customers. The predictive engine may then make a prediction of the likelihood of success based on the various bands, rather than (or in addition to) the exact terms of the individual negotiation.

The predictive engine may provide supplemental information about the likelihood of success. For example, even if the negotiation is judged to be likely unsuccessful, the predictive engine may produce feedback such as "the deal is likely to be rejected largely due to the APR being too low, however the client has a historically high negotiation success rate—please continue to negotiate!" The willingness to haggle metric may also be considered for such suggestions. Thus, certain indicators of the client and/or dealer may cause the predictive engine to suggest continuing negotiations, or conversely, express skepticism about continuing negotiations.

The predictive engine may also utilize multiple objectives, the objectives being indicated by the user and/or automatically set by the predictive engine. For example, consumer happiness may be an objective. If the predictive engine determines that the likelihood of the transaction proceeding is high, but the likelihood of the client being unhappy with the deal is also high, the predictive engine may recommend that the transaction not proceed, at least not with the current candidate terms. The objectives may be considered equally important, or may be hierarchically prioritized in relation to each other, with a higher-ranked objective being given a predetermined higher level of importance than the immediately lower-ranked objective. Alternatively, the degree of importance of one objective over another may be manually set by the user.

Optionally, at step 230, alternate terms may be suggested by the predictive engine. By predicting whether deal negotiations are likely to be successful, it is possible to augment the predictive engine to look for ways to direct the negotiation towards a successful outcome. The predictive engine may actively suggest term modifications that will increase the likelihood of success, for example that will be beneficial and acceptable to the customer. As discussed above, this may involve identifying clusters in the N-dimensional parameter space that are both successful and near to the current terms, and suggesting changes to bring the terms to more closely match the successful clusters.

The predictive engine may suggest back-end changes, such as adding an additional warranty, in the case of cars, or merely financing through the dealer. The predictive engine may also suggest front-end changes, such as increasing the offered price, decreasing the price on the trade-in, etc.

Optionally, at step 235, the predictive engine may alternatively, or in addition to the suggestion of terms changes, suggest a change to the item and/or services being subject to the transaction themselves. For example, if the predictive engine determines that a deal is, as a first threshold, unlikely, or, at a second threshold, very unlikely (any number of thresholds are possible), the predictive engine may recommend a different item with the same dealer for purchase. For example, the predictive engine may access the dealer inventory, and may suggest a car that is older, less expensive, has a minor accident records, etc., as a replacement for the car (e.g., item) under negotiation. The newly suggested item may be determined by the predictive engine to increase the odds to "successful", or may simply decrease the odds that a deal will not be reached. As another example, if the predictive engine determines that the deal is unlikely to be successful at a first threshold, the engine may recommend modifications to the proposed terms. If the predictive engine determines that the deal is unlikely to be successful at a second higher confidence threshold, the engine may recommend a different item. Alternatively, if the gap between any individual parameter and the likely successful range exceeds a predetermined amount and/or percentage, the predictive engine may recommend an alternate item. The predetermined amounts and/or percentages, as with other predetermined thresholds discussed herein, may be set as a rule by the user and/or determined by the predictive engine, for example during the machine learning process.

If the predictive engine is given access to the necessary data streams, the predictive engine may not only suggest alternate items at a particular dealer, but may suggest alternate items at other dealers. For example, if a user is searching via an internet browser on client system 105, the predictive engine may suggest similar cars (e.g., items) from multiple dealerships. The predictive engine may prioritize suggesting items that are identical, but older and/or more heavily used. For example, the predictive engine may prioritize suggestions of the same make and model of a vehicle, but an older model year, or with higher mileage, or with a minor accident on the vehicle history report, such that the value meets or is closer to the offered amount in the negotiation.

At step 237, if the likelihood of success is above a threshold, the results may automatically be displayed at step 245.

Optionally, At step 240, the predictive engine may further determine alternate terms packages that are similar, yet determined to likely be more successful. This may allow the dealer and/or client to iteratively traverse the parameter space by initially selecting a terms package that they most like among a plurality of candidate term packages. As will be discussed further in reference to FIG. 3, upon selecting a package they like best, an additional plurality of alternative packages may be determined by the predictive engine and displayed for consideration. The additional plurality of alternative packages may be determined, by the predictive engine, to be more likely or approximately as likely to succeed as the currently selected package. With techniques presented herein, the likelihood to succeed or not succeed may be presented along with a percentage likelihood, and/or a rating tier indicating a degree of likelihood.

At step 245, results may be displayed, which may include a likelihood of success of the candidate terms of the negotiation, recommended alternate terms, suggested tips to increase the likelihood of success, suggested alternate items, a plurality of suggested alternate term packages, etc. Based upon user feedback, the engine may iterate back to step 215, or one of the other steps of FIG. 2, and repeat the process.

Figure 3:
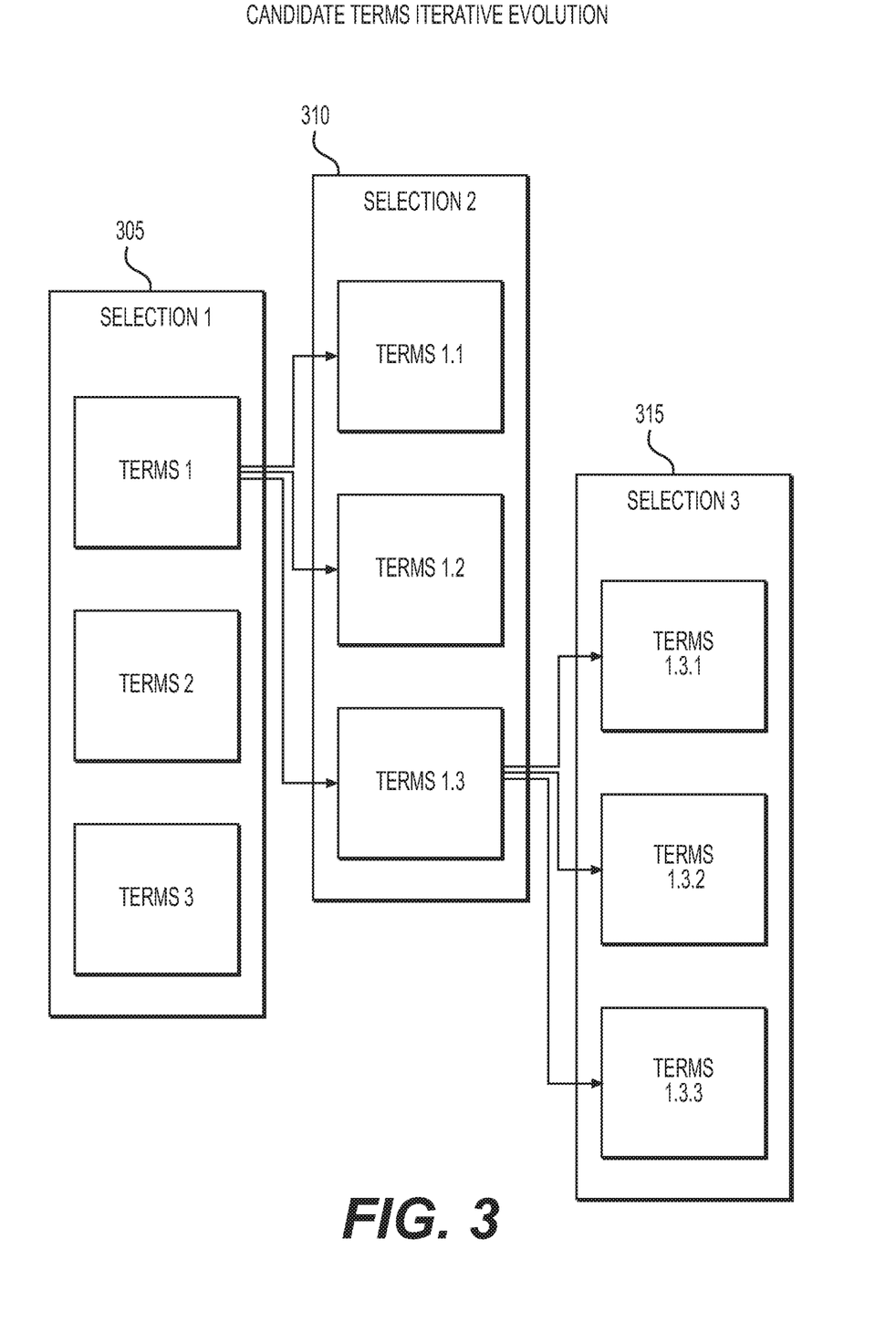
FIG. 3 illustrates a process for iteratively determining candidate terms for transactions, according to one or more embodiments.

FIG. 3 illustrates a process for iteratively determining candidate terms for transactions, according to one or more embodiments. At step 305, a user may make a first selection, which may be from a plurality of candidate terms packages, or individual terms modifications suggested by the prediction engine due to their increasing the likelihood of success of the negotiation. The user may, for example, select a first term or set of terms. Based upon that selection, at step 310 the predictive engine may determine a second plurality of term modifications, or term modification packages, to present to the user. Based upon a selection from among those, at step 315 the predictive engine may determine a third plurality of term modifications, or term modification packages, to present to the user, and so on. Each new set of candidate terms packages may be based upon the information already known about the negotiation, as well as based on the prior selections made by the user. In this manner, based upon user feedback, the predictive engine may iteratively guide the dealer and/or client to a set of terms that is highly likely to succeed, and that is amenable to all parties involved.

Figure 4:
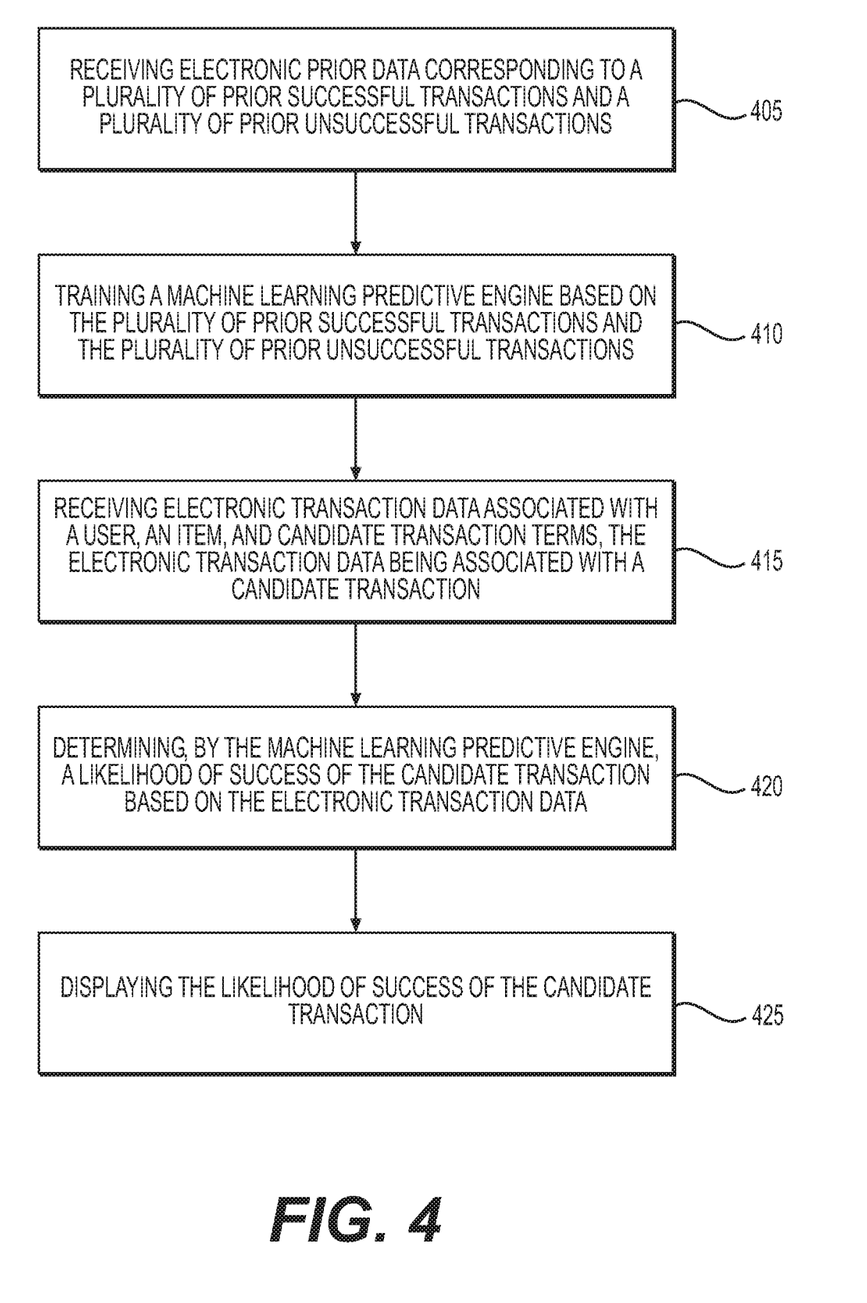
FIG. 4 illustrates a process for forecasting the outcome of candidate transactions, according to one or more embodiments.

FIG. 4 illustrates a process for forecasting the outcome of candidate transactions, according to one or more embodiments. At step 405, electronic prior transaction data may be received corresponding to a plurality of prior successful transactions and a plurality of prior unsuccessful transactions. At step 410, a machine learning predictive engine may be trained based on the plurality of prior successful transactions and the plurality of prior unsuccessful transactions. At step 415, electronic transaction data may be received associated with a user, an item, and candidate transaction terms, the electronic transaction data being associated with a candidate transaction. At step 420, a likelihood of success of the candidate transaction may be determined by the machine learning predictive engine based on the electronic transaction data. At step 425, the likelihood of success of the candidate transaction may be displayed.

Figure 5:
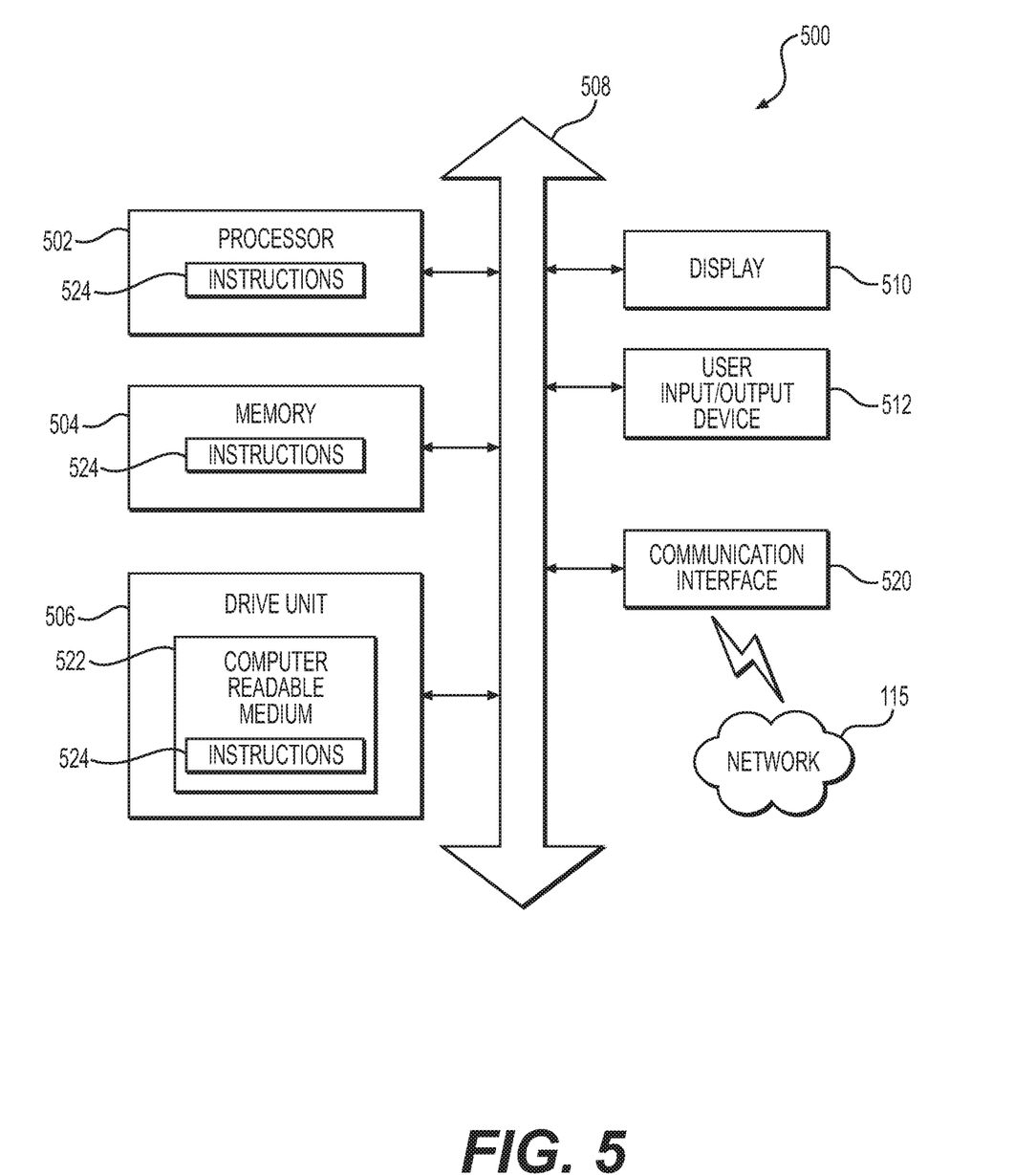
FIG. 5 is a simplified functional block diagram of a computer that may be configured as a device for executing the methods of FIGS. 2-4, according to exemplary embodiments of the present disclosure.

FIG. 5 is a simplified functional block diagram of a computer 500 that may be configured as a device for executing the methods of FIGS. 2-4, according to exemplary embodiments of the present disclosure. FIG. 5 is a simplified functional block diagram of a computer that may be configured as the lender system 120, predictive system 130, dealer system 110, third party system 125, and/or client system 105 according to exemplary embodiments of the present disclosure. Specifically, in one embodiment, any of the user devices, servers, etc., discussed herein may be an assembly of hardware 500 including, for example, a data communication interface 520 for packet data communication. The platform also may include a central processing unit ("CPU") 502, in the form of one or more processors, for executing program instructions. The platform may include an internal communication bus 508, and a storage unit 506 (such as ROM, HDD, SDD, etc.) that may store data on a computer readable medium 522, although the system 500 may receive programming and data via network communications. The system 500 may also have a memory 504 (such as RAM) storing instructions 524 for executing techniques presented herein, although the instructions 524 may be stored temporarily or permanently within other modules of system 500 (e.g., processor 502 and/or computer readable medium 522). The system 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-4, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for using a machine-learning predictive engine to predict failures, comprising:
   receiving electronic prior transaction data corresponding to a plurality of prior successful transactions and a plurality of prior unsuccessful transactions, each of the prior transactions involving a plurality of parties that includes a buyer, a seller, and a lender;
   receiving electronic transaction data associated with a candidate transaction and including information associated with a buyer, a seller, and a lender involved with the candidate transaction, an item, and candidate transaction terms for the candidate transaction, wherein the information associated with the lender includes a rule associated with one or more of a minimum annual principal rate for financing of the candidate transaction, a maximum amount for a down payment for the candidate transaction, a maximum payback period for the candidate transaction, a minimum down payment for the candidate transaction, or a maximum trade-in value for a trade-in item;
   training a machine learning predictive engine to determine a likelihood of success for the candidate transaction, by:
      defining, by the machine learning predictive engine, success for the candidate transaction based on the rule included in the information associated with the lender;
      redefining the plurality of prior successful transactions and the prior unsuccessful transactions as successful or unsuccessful, respectively, based on the rule so as to generate a plurality of redefined prior successful transactions and a plurality of redefined prior unsuccessful transactions; and training the machine learning predictive engine based on the plurality of redefined prior successful transactions and the plurality of redefined prior unsuccessful transactions;

determining, using the trained machine learning predictive engine, the likelihood of success of the candidate transaction based on the electronic transaction data associated with the candidate transaction;

causing a user device associated with a user to display the likelihood of success of the candidate transaction;

receiving an indication of whether the candidate transaction is successful;

combining the electronic transaction data associated with the candidate transaction and the indication of whether the candidate transaction is successful with the electronic prior transaction data corresponding to the plurality of prior successful transactions and the plurality of prior unsuccessful transactions; and further training the machine learning predictive engine using the combination.

2. The computer-implemented method of claim 1, further comprising:

determining whether the likelihood of success is below a predetermined threshold;

in response to determining that the likelihood of success is below the predetermined threshold, determining one or more alternate terms of the candidate transaction that increase the likelihood of success above the predetermined threshold; and causing the user device to display the one or more alternate terms of the candidate transaction.

3. The computer-implemented method of claim 1, further comprising:

determining whether the likelihood of success is below a predetermined threshold;

in response to determining that the likelihood of success is below the predetermined threshold, determining one or more alternate items of the candidate transaction that increase the likelihood of success above the predetermined threshold; and causing the user device to display the one or more alternate items of the candidate transaction.

4. The computer-implemented method of claim 3, wherein the one or more alternate items are older than the item.

5. The computer-implemented method of claim 1, wherein the electronic prior transaction data is received from a first data source, and wherein training the machine learning predictive engine further comprises:

upon determining that the plurality of prior successful transactions or the plurality of prior unsuccessful transactions is below a predetermined threshold quantity of transactions, automatically acquiring additional electronic prior transaction data from a second data source, the second data source being selected based upon similarity to the first data source.

6. The computer-implemented method of claim 1, further comprising:

determining a lower predetermined threshold;

determining a higher predetermined threshold, the higher predetermined threshold being higher than the lower predetermined threshold;

in response to determining that the likelihood of success is below the higher predetermined threshold and above the lower predetermined threshold, determining one or more alternate terms of the candidate transaction that increase the likelihood of success above the higher predetermined threshold;

in response to determining that the likelihood of success is below the higher predetermined threshold and below the lower predetermined threshold, determining one or more alternate items of the candidate transaction that increase the likelihood of success above the lower predetermined threshold; and causing the user device to display the one or more alternate terms or the one or more alternate items of the candidate transaction.

7. The computer-implemented method of claim 1, further comprising:

receiving a selection, from the user, of one of a plurality of candidate term packages; and based on the selection of one of the plurality of candidate term packages, determining, by the machine learning predictive engine, a second plurality of candidate term packages for display to the user.

8. The computer-implemented method of claim 1, wherein the candidate transaction terms are represented as a multi-dimensional vector in a multi-dimensional parameter space, and wherein determining the likelihood of success of the candidate transaction further comprises:

determining a plurality of clusters of solutions in the multi-dimensional parameter space, each of the solutions corresponding to one of the plurality of prior successful transactions or one of the plurality of unsuccessful transactions;

determining a nearest cluster of the plurality of clusters of solutions; and determining the likelihood of success of the candidate transaction based on the nearest cluster.

9. The computer-implemented method of claim 1, further comprising:

determining, by the machine learning predictive engine, a plurality of candidate transaction terms proposed by the user; and determining, based on whether a range of at least one of the plurality of candidate transaction terms entered by the user exceeds a predetermined range, a willingness to haggle associated with the user.

10. The computer-implemented method of claim 9, further comprising:

providing, by the machine learning predictive engine, at least one recommendation with regard to the candidate transaction based, at least in part, on the determined willingness to haggle.

11. A computer-implemented method for using a machine-learning predictive engine to predict failures, comprising:

receiving electronic prior transaction data corresponding to a plurality of prior successful transactions and a plurality of prior unsuccessful transactions, each of the prior transactions involving a plurality of parties that includes a buyer, a seller, and a lender;

receiving electronic transaction data associated with a candidate transaction and including information associated with a buyer, a seller, and a lender involved with the candidate transaction, an item, and candidate transaction terms for the candidate transaction, wherein the information associated with the lender includes a rule associated with one or more of a minimum annual principal rate for financing of the candidate transaction, a maximum amount for a down payment for the candidate transaction, a maximum payback period for the candidate transaction, a minimum down payment for the candidate transaction, or a maximum trade-in value for a trade-in item;
training a machine learning predictive engine to determine a likelihood of success for the candidate transaction, by:
defining, by the machine learning predictive engine, success for the candidate transaction based on the rule included in the information associated with the lender;
redefining the plurality of prior successful transactions and the prior unsuccessful transactions as successful or unsuccessful, respectively, based on the rule so as to generate a plurality of redefined prior successful transactions and a plurality of redefined prior unsuccessful transactions; and
training the machine learning predictive engine based on the plurality of redefined prior successful transactions and the plurality of redefined prior unsuccessful transactions;
determining, using the trained machine learning predictive engine, the likelihood of success of the candidate transaction based on the electronic transaction data associated with the candidate transaction;
determining whether the likelihood of success is below a predetermined threshold;
in response to determining that the likelihood of success is below a predetermined threshold, determining one or more alternate terms of the candidate transaction that increase the likelihood of success above the predetermined threshold;
causing a user device associated with a user to display the alternate terms of the candidate transaction;
receiving an indication of whether the candidate transaction including the alternative terms is successful;
combining the electronic transaction data associated with the candidate transaction, the alternative terms, and the indication of whether the candidate transaction is successful with the electronic prior transaction data corresponding to the plurality of prior successful transactions and the plurality of prior unsuccessful transactions; and
further training the machine learning predictive engine using the combination.

12. The computer-implemented method of claim 11, further comprising:
determining whether the likelihood of success is below a second predetermined threshold;
in response to determining that the likelihood of success is below the second predetermined threshold, determining one or more alternate items of the candidate transaction that increase the likelihood of success above the second predetermined threshold; and
causing the user device to display the one or more alternate items of the candidate transaction.

13. The computer-implemented method of claim 12, wherein the one or more alternate items are older than the item.

14. The computer-implemented method of claim 11, wherein the electronic prior transaction data is received from a first data source, and wherein the training the machine learning predictive engine further comprises:
upon determining that the plurality of prior successful transactions or the plurality of prior unsuccessful transactions is below a predetermined threshold quantity of transactions, automatically acquiring additional electronic prior transaction data from a second data source, the second data source being selected based upon similarity to the first data source.

15. The computer-implemented method of claim 11, further comprising:
determining a lower predetermined threshold;
determining a higher predetermined threshold, the higher predetermined threshold being higher than the lower predetermined threshold;
in response to determining that the likelihood of success is below the higher predetermined threshold and above the lower predetermined threshold, determining one or more alternate terms of the candidate transaction that increase the likelihood of success above the higher predetermined threshold;
in response to determining that the likelihood of success is below the higher predetermined threshold and below the lower predetermined threshold, determining one or more alternate items of the candidate transaction that increase the likelihood of success above the lower predetermined threshold; and
causing the user device to display the one or more alternate terms or the one or more alternate items of the candidate transaction.

16. The computer-implemented method of claim 11, further comprising:
receiving a selection, from the user, of one of a plurality of candidate term packages; and
based on the selection of one of the plurality of candidate term packages, determining, by the machine learning predictive engine, a second plurality of candidate term packages for display to the user.

17. The computer-implemented method of claim 11, wherein the candidate transaction terms are represented as a multi-dimensional vector in a multi-dimensional parameter space, and wherein determining the likelihood of success of the candidate transaction further comprises:
determining a plurality of clusters of solutions in the multi-dimensional parameter space, each of the solutions corresponding to one of the plurality of prior successful transactions or one of the plurality of unsuccessful transactions;
determining a nearest cluster of the plurality of clusters of solutions; and
determining the likelihood of success of the candidate transaction based on the nearest cluster.

18. The computer-implemented method of claim 11, further comprising:
determining, by the machine learning predictive engine, a plurality of candidate transaction terms proposed by the user; and
determining, based on whether a range of at least one of the plurality of candidate transaction terms entered by the user exceeds a predetermined range, a willingness to haggle associated with the user.

19. The computer-implemented method of claim 18, further comprising:
providing, by the machine learning predictive engine, at least one recommendation with regard to the candidate transaction based, at least in part, on the determined willingness to haggle.

20. A computer system for using a machine-learning predictive engine to predict failures, the computer system comprising:
a memory storing instructions; and
one or more processors configured to execute the instructions to perform operations including:

receiving electronic prior transaction data corresponding to a plurality of prior successful transactions and a plurality of prior unsuccessful transactions, each of the prior transactions involving a plurality of parties that includes a buyer, a seller, and a lender;

receiving electronic transaction data associated with a candidate transaction and including information associated with a buyer, a seller, and a lender involved with the candidate transaction, an item, and candidate transaction terms for the candidate transaction, wherein the information associated with the lender includes a rule associated with one or more of a minimum annual principal rate for financing of the candidate transaction, a maximum amount for a down payment for the candidate transaction, a maximum payback period for the candidate transaction, a minimum down payment for the candidate transaction, or a maximum trade-in value for a trade-in item;

training a machine learning predictive engine to determine a likelihood of success for the candidate transaction by:

redefining the plurality of prior successful transactions and the prior unsuccessful transactions as successful or unsuccessful, respectively, based on the rule, so as to generate a plurality of redefined prior successful transactions and a plurality of redefined prior unsuccessful transactions;

representing each of the plurality of redefined prior successful transactions and each of the plurality redefined of prior unsuccessful transactions as a respective a multi-dimensional vector in a multi-dimensional parameter space;

defining a first cluster in the multi-dimensional parameter space associated with the redefined successful transactions;

defining a second cluster in the multi-dimensional parameter space associated with the redefined unsuccessful transactions;

representing the candidate transaction as a further multi-dimensional vector in the multi-dimensional parameter space based on the electronic transaction data associated with the candidate transaction; and determining the likelihood of success of the candidate transaction based on relative distances between the further multi-dimensional vector of the candidate transaction and the first and second clusters, respectively;

causing a user device associated with a user to display the likelihood of success of the candidate transaction;

receiving an indication of whether the candidate transaction is successful;

combining the electronic transaction data associated with the candidate transaction and the indication of whether the candidate transaction is successful with the electronic prior transaction data corresponding to the plurality of prior successful transactions and the plurality of prior unsuccessful transactions; and further training the machine learning predictive engine using the combination.

* * * * *